United States Patent [19]

Schenck

[11] Patent Number: 5,725,241
[45] Date of Patent: Mar. 10, 1998

[54] AIR BAG COVER ASSEMBLY

[75] Inventor: Michael Allen Schenck, Miamisburg, Ohio

[73] Assignee: General Motors Corporation, Detroit, Mich.

[21] Appl. No.: 636,857

[22] Filed: Apr. 23, 1996

[51] Int. Cl.⁶ .................................................. B60R 21/16
[52] U.S. Cl. ................................. 280/731; 280/728.3
[58] Field of Search ............................ 280/728.3, 731

[56] References Cited

U.S. PATENT DOCUMENTS

| | | | |
|---|---|---|---|
| 4,934,735 | 6/1990 | Embach | 264/46.4 |
| 5,002,306 | 3/1991 | Hiramitsu et al. | 280/731 |
| 5,062,661 | 11/1991 | Winget | 280/731 |
| 5,338,059 | 8/1994 | Inoue et al. | 280/728 B |
| 5,344,185 | 9/1994 | Cooke, II | 280/731 |
| 5,369,232 | 11/1994 | Leonelli | 260/61.54 |
| 5,484,561 | 1/1996 | Weber et al. | 264/46.4 |

*Primary Examiner*—Brian L. Johnson
*Assistant Examiner*—Jonathan E. Butts
*Attorney, Agent, or Firm*—Kathryn A. Marra

[57] ABSTRACT

An air bag cover assembly includes a container having a substrate layer and an outer layer covering the substrate layer. The substrate layer includes a switch aperture extending therethrough. A membrane horn switch is positioned substantially within the switch aperture and adjacent the outer layer. A backing plate is mounted to the substrate layer and overlies the switch aperture such that the membrane horn switch is captured between the outer layer and the backing plate. Thus, the membrane horn switch is easily actuated only by the compression of the outer layer of the container without compression of the substrate layer.

13 Claims, 1 Drawing Sheet

AIR BAG COVER ASSEMBLY

This invention relates generally to an air bag cover assembly including a membrane horn switch.

BACKGROUND OF THE INVENTION

It is well known in motor vehicles to provide an air bag module mounted to a steering wheel. The air bag module typically includes an inflator for generating gas to inflate an air bag for restraining an occupant. The air bag module also typically includes an air bag cover which houses the air bag and inflator. The cover includes breakable tear seams which open upon air bag deployment.

It is known to provide an air bag cover made of a resilient thermoplastic material. It is also known to mount membrane horn switches beneath the thermoplastic material of the cover. These membrane horn switches conventionally comprise two very thin sheets having conductive coatings which are normally separated by thin spacers. Pressure on the switch presses the conductive surfaces together to close a circuit and actuate a horn. Typical membrane horn switches are less than one millimeter in thickness. To actuate the horn, the driver must sufficiently compress the cover to apply pressure to the membrane horn switch for actuating the horn.

It is also known in the prior art that a soft foam outer layer may be provided over the thermoplastic cover for a softer look and feel that better matches some steering wheels. Typically, the outer foam material has a thickness greater than that of the thermoplastic material. In this case, actuation of the horn is accomplished by compressing both the soft foam outer layer and the underlying thermoplastic material of the cover.

SUMMARY OF THE INVENTION

The present invention preferably provides an improved feel and ease of horn actuation while providing an aesthetically pleasing air bag cover assembly. Preferably, the horn actuation has a softer feel and the horn is actuated with less compression of the air bag cover assembly than prior art modules.

These advantages are preferably accomplished in the present invention by providing an air bag cover assembly including a container having a substrate layer and an outer layer covering the substrate layer. The outer layer is preferably a relatively soft material such as urethane foam. The substrate layer includes a switch aperture extending therethrough. A membrane horn switch is positioned substantially within the switch aperture and preferably adjacent the outer layer. A backing plate is mounted to the substrate layer and overlies the switch aperture such that the membrane horn switch is captured between the outer layer and the backing plate. Thus, the membrane horn switch is preferably actuated only by the compression of the outer layer of the container without compression of the substrate layer.

Preferably, a raised portion is disposed on the backing plate. The raised portion is preferably sized for receipt in the switch aperture and located between the membrane horn switch and the backing plate to reduce the distance between the outer layer and the membrane horn switch. Preferably, the membrane horn switch is mounted on the raised portion. The raised portion is preferably sized to substantially fill the switch aperture and may be integrally formed with the backing plate.

In another preferred form of the invention, the substrate layer is thermoplastic and the outer layer is a soft urethane foam.

BRIEF DESCRIPTION OF THE DRAWINGS

The present invention is described below, by way of example only, with reference to the accompanying drawings in which.

DESCRIPTION OF THE PREFERRED EMBODIMENT

Figure 1:
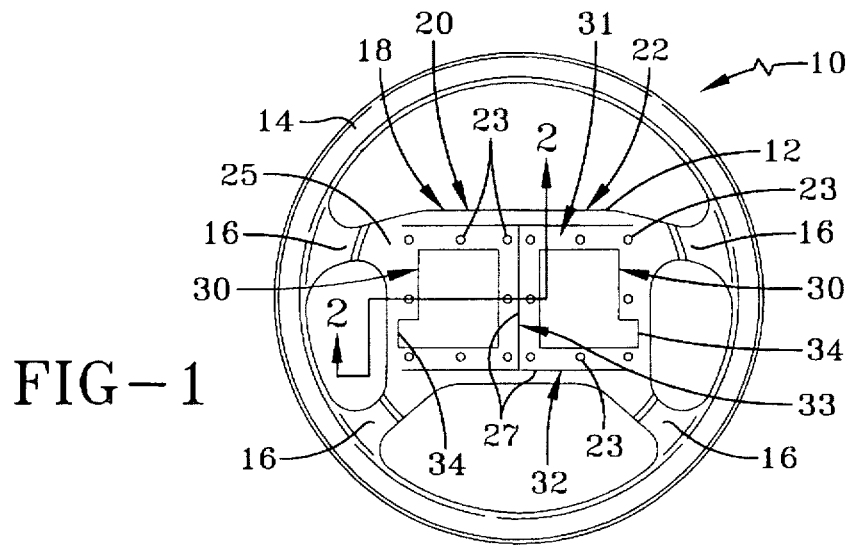
FIG. 1 is a plan view of a steering wheel and an air bag cover assembly according to the present invention.

Referring to FIG. 1, a vehicle steering wheel 10 includes a central hub portion 12, a generally circular outer rim portion 14, and a plurality of spokes 16 extending between the hub portion 12 and the rim portion 14. An air bag module 18 is mounted on the hub portion 12 of the steering wheel 10. The air bag module 18 includes an air bag (not shown) and an inflator (not shown) for generating gas to inflate the air bag. The air bag module 18 also includes an air bag cover assembly, generally designated as 20. The air bag cover assembly 20 includes a container 22, a membrane horn switch 30, and a backing plate 40, described in detail hereinafter.

Figure 2:
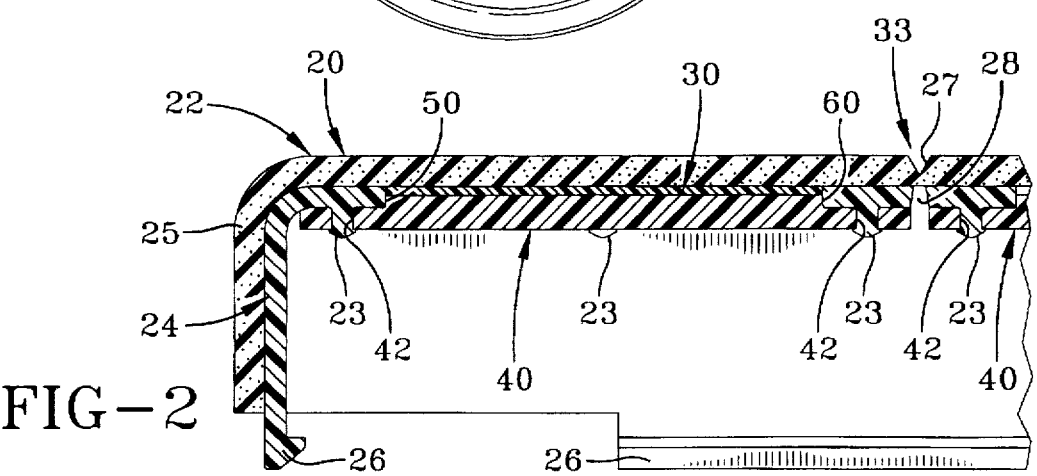
FIG. 2 is a sectional view taken along line 2—2 of FIG. 1.

As best shown in FIG. 2, the container 22 includes an inner substrate layer 24 preferably being a resilient thermoplastic material. The container 22 also includes an outer layer 25 preferably being a soft urethane foam which adheres to the thermoplastic material of the substrate layer 24 to form the container 22 as one unitary container 22 handled as a single component during assembly. The container 22 is preferably cup-shaped for housing the air bag and inflator therein. The substrate layer 24 preferably includes downwardly extending hooks 26 spaced around its perimeter for attaching the air bag cover assembly 20 to a base (not shown) of the air bag module 18.

As best shown in FIG. 1, the outer layer 25 preferably includes superficial grooves 27 in an "T"-shaped pattern and underlying slots on the substrate layer 24, such as a central slot 28, which cooperatively provide weakened tear seams 31, 32, 33 along which the container 22 is forcibly opened by deployment of the air bag upon discharge of gas by the inflator. The tear seams 31, 32, 33 include an upper tear seam 31, a lower tear seam 32, and a central tear seam 33 cooperatively providing an "T"-shaped tear pattern on the container 22.

Figure 3:
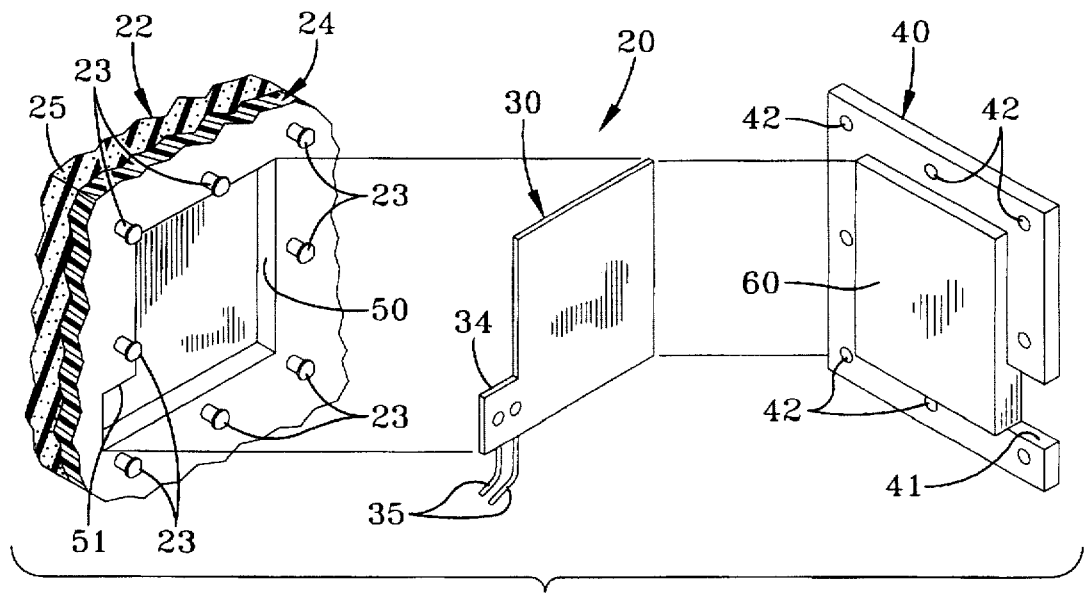
FIG. 3 is an exploded perspective view of the air bag cover assembly partially broken away.

As best shown in FIG. 1, the air bag cover assembly 20 includes a pair of membrane horn switches 30 mounted beneath the container 22. The membrane horn switches 30 are each located on opposing sides of the central tear seam 33. The membrane horn switches 30 each include a tab portion 34 to which electrical wires 35 are connected as best shown in FIG. 3. The very thin membrane horn switches 30 may be of any conventional construction and are shown schematically as a solid plastic material. The membrane horn switches 30 may be comprised of two thin sheets having conductive coatings thereon separated by thin spacers. Upon the application of pressure to the membrane horn switches 30, the conductive surfaces are brought together to close a circuit and actuate a horn. The membrane horn switches 30 are very thin, preferably being less than a millimeter in thickness.

It will be appreciated that the air bag cover assembly 20 is preferably mirrored about the central tear seam 33, such that a further detailed description of the components will be given with respect to one half of the air bag cover assembly 20 as shown in FIGS. 2 and 3.

As best shown in FIGS. 2 and 3, the substrate layer 24 includes a switch aperture 50 preferably extending entirely through the substrate layer 24. The switch aperture 50 is sized and shaped for closely receiving the membrane horn switch 30 therein. The switch aperture 50 preferably includes a tab aperture 51 in which the tab portion 34 of the membrane horn switch 30 is seated during assembly for alignment of the membrane horn switch 30 relative the container 22, as described further hereinafter. As best shown in FIG. 2, the membrane horn switch 30 is preferably positioned directly adjacent the outer layer 25 of the container 22 in the assembled condition. The substrate layer 24 further includes a plurality of outwardly projecting mounting posts 23 spaced apart around the switch aperture 50. The outwardly projecting mounting posts 23 are preferably integrally formed with the substrate layer 24 of thermoplastic material. It will be appreciated that the mounting posts 23 may vary in size and number depending on the desired strength to hold the backing plate 40 onto the substrate layer 24, as described further hereinafter.

Referring to FIGS. 2 and 3, the air bag cover assembly 20 further includes the backing plate 40 for overlying the switch aperture 50 and for capturing the membrane horn switch 30 within the switch aperture 50. The backing plate 40 is preferably made of a plastic material being sufficiently stiff to serve as a reaction surface when pressure is applied to the membrane horn switch 30. The backing plate 40 preferably has a generally rectangular shape and is sized larger than the switch aperture 50. The backing plate 40 preferably has an indented portion 41 overlying the tab aperture 51 such that the wires 35 from the tab portion 34 of the membrane horn switch 30 are free to extend out through the backing plate 40 for connection to an electrical source. The backing plate 40 preferably includes a plurality of post apertures 42 aligned for receiving the mounting posts 23 of the substrate layer 24 therethrough, as described below.

A raised portion 60 is disposed on the backing plate 40. The raised portion 60 preferably has a generally rectangular shape and is sized for substantially filling the switch aperture 50. The raised portion 60 is preferably made of a plastic material being sufficiently stiff to serve as a reaction surface when pressure is applied to the membrane horn switch 30. The raised portion 60 may be a separate piece attached to the backing plate 40, such as by bonding or gluing. The raised portion 60 may also be integrally molded with the backing plate 40 for reduction of components in the air bag cover assembly 20.

It will be appreciated that the raised portion 60 preferably has a perimeter and a thickness which approximately matches that of the switch aperture 50 such that the switch aperture 50 is substantially filled by the raised portion 60 and the overlying thin membrane horn switch 30, as described further hereinafter. The raised portion 60 preferably does not fill the tab aperture 51 of the switch aperture 50 such that the tab portion 34 of the membrane horn switch 30 is not enclosed leaving the wires 35 connected thereto a path out from behind the backing plate 40 for connection to an electrical source. Preferably, the raised portion 60, switch aperture 50 and membrane horn switch 30 are sized to substantially fill the area between the mounting posts 23 on the substrate layer 24 for the maximum amount of horn actuation area on the air bag cover assembly 20.

The air bag cover assembly 20 is preferably assembled as follows with reference to FIG. 3. The container 22 is formed with the substrate layer 24 having the switch aperture 50 therein and with the soft foam outer layer 25 adhered to the substrate layer 24. Preferably, the raised portion 60 is disposed on the backing plate 40 either by gluing or bonding thereto or being integrally formed therewith. The membrane horn switch 30 is placed between the raised portion 60 on the backing plate 40 and the switch aperture 50. The tab portion 34 of the membrane horn switch 30 is aligned with the tab aperture 51 and with the indented portion 41 of the backing plate 40. The membrane horn switch 30 may optionally be glued or otherwise attached to the raised portion 60 on the backing plate 40. The post apertures 42 on the backing plate 40 are matably aligned with the mounting posts 23 on the substrate layer 24. As best shown in FIG. 2, the membrane horn switch 30 is inserted into the switch aperture 50 in a position directly adjacent the soft outer layer 25 of the container 22. The raised portion 60 is positioned to substantially fill the switch aperture 50 and holds the membrane horn switch 30 adjacent the soft outer layer 25 of the container 22. The mounting posts 23 extend through the post apertures 42 on the backing plate 40 and the backing plate 40 is heat staked to the substrate layer 24 such that the air bag cover assembly 20 is in the final assembled condition as shown in FIGS. 1 and 2.

In the assembled condition, it will be appreciated that back panel 40 overlies the switch aperture 50 and is mounted to the substrate layer 24 such that the switch aperture 50 creates a pocket between the outer layer 25 and the backing plate 40 which is substantially filled by the combined thickness of the raised portion 60 and the membrane horn switch 30. Thus, the raised portion 60 preferably has a thickness that positions the membrane horn switch 30 directly beneath the soft outer layer 25. Thus, the horn is easily actuated by pressing on the soft outer layer 25 which applies pressure to the membrane horn switch 30 to close the circuit and actuate the horn. The raised portion 60 and backing plate 40 are sufficiently stiff to serve as a reaction surface against which the membrane horn switch 30 may be compressed for actuation of the horn.

Advantageously, the feel and ease of horn actuation is improved since pressure need only be applied to the soft outer layer 25 to actuate the horn and not additionally through the stiffer substrate layer 24. Also, the raised portion 60 positions the membrane horn switch 30 adjacent the outer layer 25 such that less displacement of the air bag cover assembly 20 is required to pressurize the membrane horn switch 30 and actuate the horn. In addition, the outer layer 25 of foam covering the substrate layer 24 provides an aesthetically pleasing look and feel to the air bag cover assembly 20 while preferably decreasing horn blowing efforts.

Upon air bag deployment, the deploying air bag breaks open the container 22 along the "T"-shaped tear seams 31, 32, 33. The container 22 opens and each of the membrane horn switches 30 and backing plates 40 remain attached to their respective halves of the container 22 during air bag inflation as enabled by the mounting posts 23.

It will be understood that a person skilled in the art may make modifications to the embodiments shown herein within the scope and intent of the claims. For example, although preferred embodiment shows a pair of membrane horn switches 30, one or more than two membrane horn switches 30 could be seated in a corresponding number of switch apertures 50 with a corresponding number of backing plates 40 and raised portions 60. Although the backing plates 40 are shown connected to the substrate layer 24 by heat staking, other conventional methods of fastening are also possible.

While the present invention has been described as carried out in a specific embodiment thereof, it is not intended to be limited thereby but is intended to cover the invention broadly within the scope and spirit of the appended claims.

What is claimed is:

1. An air bag cover assembly comprising:

a container having an inner substrate layer and an outer layer overlying the substrate layer;

the substrate layer having a switch aperture extending entirely therethough to provide a hole in the substrat layer;

a membrane horn switch positioned within the switch aperture and directly beneath the outer layer such that compression of the outer layer of the container activates the membrane horn switch while avoiding compression of the substrate layer; and a backing plate mounted to the substrate layer beneath the membrane horn switch and overlying the switch aperture to capture the membrane horn switch within the switch aperture between the backing plate and the outer layer.

2. The air bag cover assembly of claim 1 wherein a raised portion is disposed on the backing plate for substantially filling the switch aperture between the membrane horn switch and the backing plate.

3. The air bag cover assembly of claim 2 wherein the membrane horn switch is mounted on the raised portion.

4. The air bag cover assembly of claim 1 wherein the backing plate is mounted to the substrate layer by heat staking.

5. The air bag cover assembly of claim 1 wherein a raised portion is disposed on the backing plate, and wherein the membrane horn switch is mounted on the raised portion, the raised portion being sized for receipt in the switch aperture and located between the membrane horn switch and the backing plate to reduce the distance between the outer layer and the membrane horn switch.

6. The air bag cover assembly of claim 1 wherein a raised portion is disposed on the backing plate and positioned between the membrane horn switch and the backing plate.

7. The air bag cover assembly of claim 6 wherein the membrane horn switch is mounted on the raised portion.

8. The air bag cover assembly of claim 6 wherein the raised portion is integrally formed with the backing plate.

9. The air bag cover assembly of claim 6 wherein the raised portion is sized to substantially fill the switch aperture.

10. The air bag cover assembly of claim 1 wherein the substrate layer is plastic and wherein the outer layer is foam.

11. The air bag cover assembly of claim 1 wherein the substrate layer is thermoplastic.

12. The air bag cover assembly of claim 1 wherein the outer layer is a urethane foam covering.

13. The air bag cover assembly of claim 1 wherein the substrate layer is thermoplastic and wherein the outer layer is a urethane foam covering.

* * * * *